"A New FSK-Based Method for Coherent Optical CDMA Systems," IEEE 2000 to Kats et al.*

* cited by examiner

*Primary Examiner*—Kenneth Vanderpuye
*Assistant Examiner*—Ken Malkowski
(74) *Attorney, Agent, or Firm*—Derrick Michael Reid

(57) ABSTRACT

A direct-sequence-spread-spectrum (DSSS) optical-frequency-shift-keying (OFSK) code-division-multiple-access (CDMA) communication system is adapted with optical transmitters and receivers for preferred use fiber optical communication systems where modulated data and pseudo-random noise (PRN) codes are encoded in the optical domain and communicated over optical paths for increasing system capacity in wide area optical networks.

13 Claims, 2 Drawing Sheets

(12) United States Patent
Dafesh

(10) Patent No.: US 7,200,342 B2
(45) Date of Patent: Apr. 3, 2007

(54) DIRECT-SEQUENCE SPREAD-SPECTRUM OPTICAL-FREQUENCY-SHIFT-KEYING CODE-DIVISION-MULTIPLE-ACCESS COMMUNICATION SYSTEM

(75) Inventor: Philip A. Dafesh, Los Angeles, CA (US)

(73) Assignee: The Aerospace Corporation, El Segundo, CA (US)

( * ) Notice: Subject to any disclaimer, the term of this patent is extended or adjusted under 35 U.S.C. 154(b) by 711 days.

(21) Appl. No.: 10/165,661

(22) Filed: Jun. 6, 2002

(65) Prior Publication Data

US 2004/0208233 A1 Oct. 21, 2004

(51) Int. Cl.
*H04B 10/04* (2006.01)
(52) U.S. Cl. ...................... 398/182; 398/183
(58) Field of Classification Search ............. 398/182, 398/183, 187
See application file for complete search history.

(56) References Cited

U.S. PATENT DOCUMENTS

| | | | | |
|---|---|---|---|---|
| 5,594,577 A | * | 1/1997 | Majima et al. | 398/79 |
| 5,654,814 A | * | 8/1997 | Ouchi et al. | 398/196 |
| 5,760,941 A | * | 6/1998 | Young et al. | 398/183 |
| 6,018,547 A | * | 1/2000 | Arkhipkin et al. | 375/133 |
| 6,898,197 B1 | * | 5/2005 | Lavean | 370/335 |
| 2002/0156603 A1 | * | 10/2002 | Alhadef et al. | 703/2 |
| 2003/0072051 A1 | * | 4/2003 | Myers et al. | 359/115 |
| 2003/0103771 A1 | * | 6/2003 | Atmur et al. | 398/152 |
| 2003/0147655 A1 | * | 8/2003 | Shattil | 398/182 |
| 2003/0193914 A1 | * | 10/2003 | Lomp et al. | 370/335 |

OTHER PUBLICATIONS

"OCDMA Systems Used for High-Capacity Optical Fiber Networks-System Description, OTDMA Comparison, and OCDMA/WDMA Networking," Journal of Lightwave Technology, vol. 18 No. 6 Jun. 2000 to Huang et al.*

$i^{th}$ OFSK CDMA TRANSMITTER

DIRECT-SEQUENCE OPTICAL-FREQUENCY-SHIFT-KEYING
CODE-DIVISION-MULTIPLE-ACCESS
COMMUNICATION SYSTEM i<sup>th</sup> OFSK CDMA TRANSMITTER k<sup>th</sup> OFSK CDMA RECEIVER

DIRECT-SEQUENCE SPREAD-SPECTRUM OPTICAL-FREQUENCY-SHIFT-KEYING CODE-DIVISION-MULTIPLE-ACCESS COMMUNICATION SYSTEM

FIELD OF THE INVENTION

The invention relates to the fields of spread spectrum code division multiple access systems and optical fiber communication systems. More particularly, the present invention relates to direct-sequence spread-spectrum optical-frequency-shift-keying code-division-multiple-access communications adapted for use in a fiber optics networked communications system.

BACKGROUND OF THE INVENTION

Wide bandwidth communication systems are recognized as a necessity in the transmission of video, and other high rate data signals. In particular, fiber optics communications, in general, have become increasingly popular as a means to extend the bandwidth of existing networks. Fiber optic communications will continue to exist in communication infrastructures as consumer demand for network bandwidth continues to increase. A number of different optical spread-spectrum code division multiple access (CDMA) schemes have been proposed to facilitate asynchronous multiple user access to the wide bandwidth internet and to all-optical networks. These schemes employ spread-spectrum modulation in the optical domain to divide user channels into different codes, rather than into spectral bands, that is, frequency bands, as is the case for spectrum-sliced wavelength division multiplexing (WDM) systems.

Current CDMA spread spectrum approaches have been used to provide wireless cellular phone services, and are believed to have several advantages for optical network access. A further advantage of spread spectrum systems, in general, is that spread spectrum systems are inherently secure due to the use of pseudorandom spreading code sequences that can be cryptographically varied. Spread spectrum communications also relieves network switching, thereby permitting asynchronous user access. Because each user channel is identified by a unique spreading code, data spread with a spreading code is only available to a receiver that uses the appropriate code sequence for despreading. Thus, optical spectrum spreading has application to asynchronously accessed, multiple-user, ultrawide bandwidth fiber-optic, local area networks, and secure optical communications, through both free-space and optical fibers, in wavelengths up to thousands of GHz. This is contrasted with frequency division, that is, wavelength division multiple access (WDMA) schemes where RF switching networks are necessary to channelize end user data.

In particular, optical CDMA communications is applicable to optical communications networks due to the inherent ability to increase the capacity and improve the performance of existing WDM systems, without altering the basic infrastructure of existing fiber-optic networks. This capacity increase results in significant cost savings applicable to fiber optical networks. Also, the inherent transmission security characteristics of CDMA systems makes optical CDMA an excellent means to transmit secured communications across fiber optical networks, as may be desired for application to satellite ground station networks.

Optical CDMA systems have been proposed for application to fiber-optic networking employing binary amplitude shift keying where data is susceptible to amplitude fluctuations. Optical CDMA employing pulse position-encoded spreading sequence and amplitude shift keying is susceptible to optical dispersion in optical fibers producing significant losses in matched filter detection, and as such, optical amplitude shift keying is susceptible to amplitude fluctuations resulting in degraded communications. Spectrum spreading in optical fiber systems requires noncoherent detection, because it is difficult to encode the phase of an optical signal due to fiber dispersion.

Optical CDMA approaches using bipolar codes, such as a 0 and 1 binary code transmitted as +/−1 symbols, have inherent compatibility with direct sequence multiple user CDMA systems. Unipolar coding approaches represent a 1 by signal presence and represent a 0 by signal absence such as in on/off keying of optical sources where new optical orthogonal codes are employed to optimize the correlation properties of on/off keyed systems. Optical CDMA systems may also rely on spectral encoding of an optical signature using spatial filters, such as patterned masks, or spectrally coded light sources. Unfortunately, on/off keyed systems have limited flexibility in spreading code allocation because each code is implemented in a unchangeable amplitude mask. A complementary spectral encoding approach allows for the implementation of reconfigurable bipolar codes. However, the complementary spectral encoding approach is limited in code length, and employs binary amplitude shift keyed data that is more susceptible to source fluctuations than frequency shift keyed data employed in frequency shift keying modulated dense WDM systems. Existing optical CDMA systems do not use the available optical spectrum with system flexibility and compatibility with high throughput WDM system technology. These and other disadvantages are solved or reduced using the invention.

SUMMARY OF THE INVENTION

An object of the invention is to provide a digital optical code division multiple access system (CDMA).

Another object of the invention is to provide an optical CDMA using direct sequence spectrum spreading.

Yet another object of the invention is to provide an optical CDMA system using direct sequence spectrum spreading and frequency shift keying modulation.

Still another object of the invention is to provide an optical CDMA system using direct sequence spectrum spreading and frequency shift keying modulation applicable to optical communication networks.

The present invention is directed to an optical CDMA system. The CDMA system is digitally reconfigurable and relatively immune to low source fluctuations. The optical CDMA system uses differential despreading and conventional correlation for direct sequence spread spectrum communications using an equivalent one bit multiplier and an integrator or a low pass filter. The system can be applied to switchless fiber optic local area networks offering a wide bandwidth of greater than a hundred MBPS. The system enables increased capacity of existing wavelength division multiplexing systems for supporting more users. The optical CDMA system suppresses common-mode noise and saves costs associated with expanding or upgrading WDM networks while offering secure wide bandwidth communications across civilian fiber optic networks. The system is preferably a two-wavelength bipolar optical CDMA system that provides digitally reconfigurable spreading codes. A direct sequence optical frequency shift keying (OFSK) CDMA approach combines direct sequence spreading and orthogonal FSK modulation.

The system provides digital CMDA code reconfigurability using direct-sequence CMDA signaling. Efficient spectrum usage and increased channelization is realized by a combination of FDMA WDM and CDMA without a significant increase in system complexity. The system provides a secure means to transport multiple user data across a wide bandwidth network while maintaining flexibility to reassign secure spreading sequences to different user channels. This reassignment may be implemented digitally by periodically changing the spreading sequences in response to a cryptographic key assigned to an optical network user. The system has applications to fiber optical networks and secure communication along both free-air and fiber optic links. The system has application to M-ary OFSK with M-ary optical CDMA spreading code signaling. These and other advantages will become more apparent from the following detailed description of the preferred embodiment.

DETAILED DESCRIPTION OF THE PREFERRED EMBODIMENT

Figure 1:
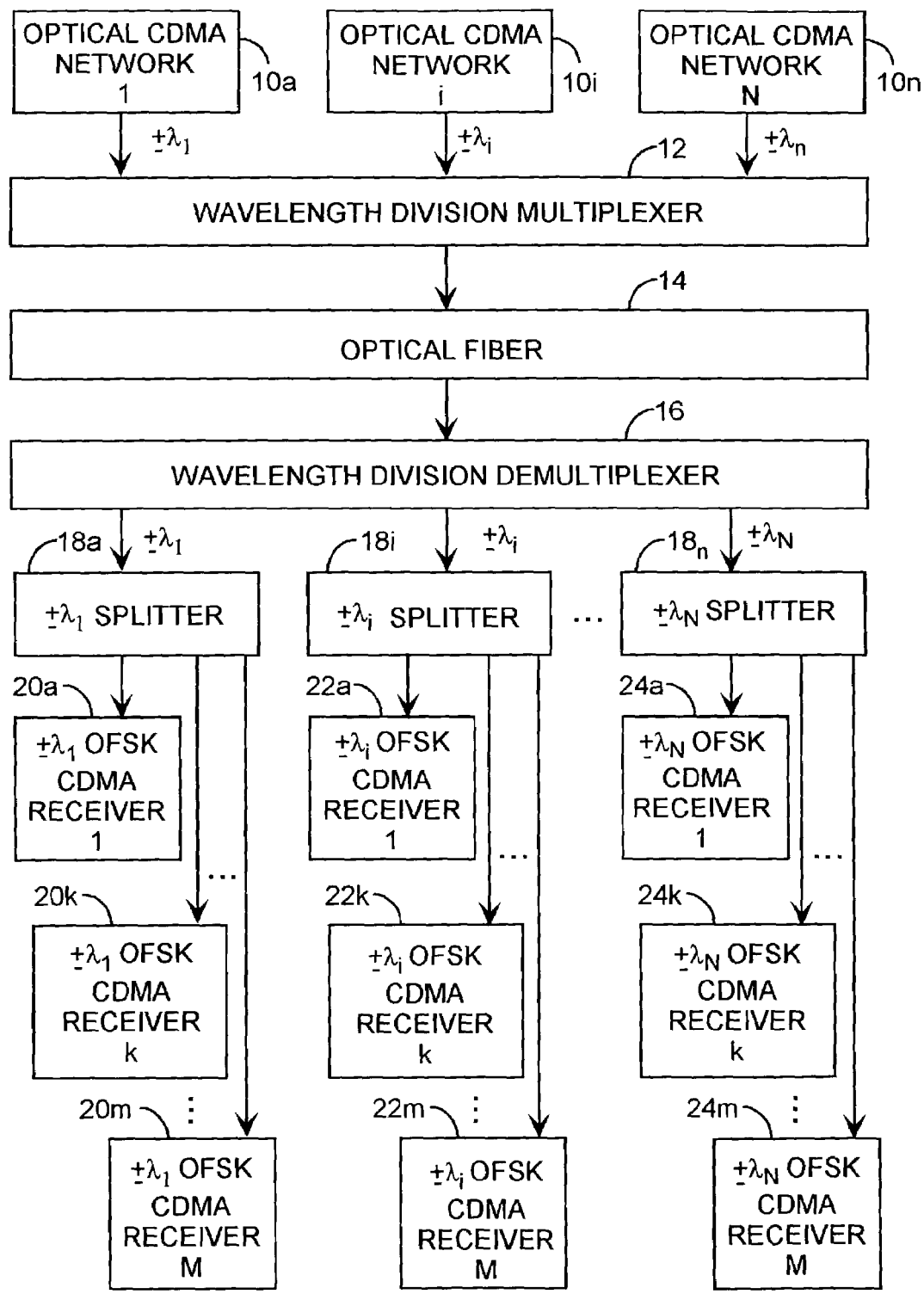
FIG. 1 is a diagram of a direct-sequence Optical-shift-keying code-division-multiple-access (CDMA) communication system.

An embodiment of the invention is described with reference to the figures using reference designations as shown in the figures. Referring to FIG. 1, a direct sequence spread spectrum optical-frequency-shift-keying (OFSK) code-division-multiple-access (CDMA) communication system is preferably adapted for use in an N-channel dense wavelength division multiplexed (WDM) system. The system uses wavelength pairs, such as $\pm\lambda i$ wavelength pairs, and is based on OFSK modulation where each pair of wavelengths $\pm\lambda i$ is used to transmit code division multiplexed signals using direct sequence spread spectrum codes. Zero or one code chips of the spreading code are represented in the frequency domain by the $\pm\lambda i$ wavelength pairs, where for example, $+\lambda i$ may represent a binary one chip and $-\lambda i$ may be a binary zero chip of the spectrum spreading code. Communication data is direct-sequence spectrum spread by the spectrum spreading code so that the data is modulated by the spectrum spreading code resulting in a $\pm\lambda i$ OFSK signal where the optical signal transitions between the $\pm\lambda i$ wavelengths according to the data that has been direct-sequence spectrum spread by the spreading code.

The system may include N different optical CDMA networks $10a$, through $10i$ through $10n$ transmitting signals in 2N different wavelength bands of a wavelength division multiplexer 12 connected through an optical fiber 14 to a wavelength division demultiplexer 16. The 2N wavelengths bands are used to transmit bipolar N bipolar wavelength signals $\pm\lambda 1$ through $\pm\lambda N$ through N OFSK channels, where a binary 1 is encoded as one wavelength $+\lambda i$ and a binary zero is encoded by a separate wavelength $-\lambda i$. The wavelength pairs $\pm\lambda i$ are selected to be sufficiently different in frequency that the encoded $+\lambda i$ and $-\lambda i$ wavelengths do not interfere with each another over the optical fiber 14.

The optical fiber 14, the WDM multiplexer 12, and the WDM demultiplexer 16 are used to route the N OFSK data channels from the N fiber optical CDMA source networks $10a$ through $10i$ through $10n$, to N OFSK CDMA receiver networks $18a$ through $18i$ through $18N$, respectively, each having M receivers $20a$ through $22k$ through $22m$, M receivers $22a$ through $22k$ through $22m$, and M receivers $24a$ through $24k$ through $24m$. Each of these receivers networks is identified by one a front end optical splitter $18a$, through $18i$ through $18n$, and a respective plurality of M receivers. The N optical receiver networks emerging from the front end optical splitter $18a$, through $18i$ through $18n$, communicates a respective different pair of wavelengths $\pm\lambda i$, using 2N lines of optical fibers. Each receiver network distributes M CDMA user channels using respective optical CDMA spreading codes. Hence, the exemplar OFSK CDMA system is configured to have a total of N×M total data channels for increased bandwidth capacity.

Figure 2:
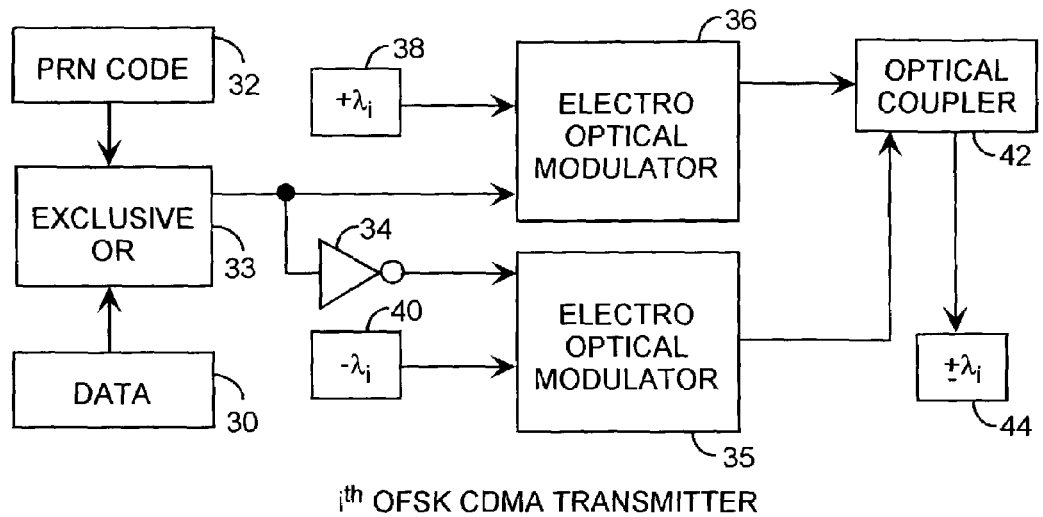
FIG. 2 is a diagram of an $i^{th}$ CDMA network.

Referring to FIGS. 1 and 2, and particularly to FIG. 2, an $i^{th}$ CDMA source network is a source transmitter for communicating data 30 that is spectrum spread by a pseudorandom (PRN) spreading code from a PRN generator 32 coupled to and using an exclusive-or gate 33 to direct sequence spectrum spread the data 30 for each data channel that is modulated by a respective PRN spreading code 32. The optical transmitter sources binary-valued data 30 that is combined with the binary PRN code from the PRN code generator 32. The spread spectrum electrical output from the exclusive-or gate 33 is inverted by an inverter 34 for providing noninverted and inverted matched exclusive-or outputs in the electrical domain that are used to encode the direct-sequence spread data on the $+\lambda i$ and the $-\lambda i$ channels. The negative spread spectrum output from inverter 34 and the positive spread spectrum output from the exclusive-or gate 33 are fed to respective electrooptical modulators 35 and 36 optically receiving respective $-\lambda i$ and $+\lambda i$ wavelength optical signals from optical signal generator 38 and 40 for providing respective optical frequency shift keyed (OFSK) $-\lambda i$ and $+\lambda i$ outputs that are coupled together using an optical coupler 42 for providing a $\pm\lambda i$ spread spectrum signal 44. The exclusive-or function can be implemented using high-speed digital electronics. A binary one is encoded by the generation of a $+\lambda i$ wavelength signal, as provided by the electrooptical modulator 36, and a binary zero is encoded as by the generation of the $-\lambda i$ wavelength signal. The $-\lambda i$ wavelength signal is equivalent to −1 for NRZ formatted data and is generated whenever a low value binary zero is present on the input of the inverter 34. Hence, at any one time, only one of the $+\lambda i$ and $-\lambda i$ two wavelengths are generated for optical frequency shift keyed signaling. The wavelengths $\pm\lambda i$ may be generated by the optical signal generators 38 and 40 that may be provided by a laser diode tuned to the desired wavelengths. The wavelengths $\pm\lambda i$ may also be generated by providing spectrally slicing a broadband optical source using a grating to disperse wavelengths and a spatial filter to select the desired spectra component. The transmitted $\pm\lambda i$ wavelength pairs 44 are communicated for M different CDMA channels to respective M receivers, such as the M receivers $22a$ through $22k$ through $22m$ connected to $\pm\lambda i$ splitter $18i$. The transmitted $\pm\lambda i$ wavelength pairs 44 are modulated by M respective different orthogonal PRN codes, for example, for M different PRN code generators 32 for respectively modulating data from M different data generators 30. The M different CDMA channels employ an orthogonal family of M different bipolar CDMA codes that may be, for example, Gold codes or similar direct sequence spread spectrum codes with low cross-correlation properties suitable for CDMA signaling. The optical signals from each CDMA network $10a$ through $10i$ through $10n$ therefore are two OFSK $+\lambda i$ and $-\lambda i$ wavelengths optical signals that are uniquely spectrum spread by a respective code. However, these OFSK $+\lambda i$ and −λi wavelengths optical signals may have undesired intensity variations produced by signal distortion of OFSK ±λi wavelength optical signals during transmission through optical fibers, optical networks and splitters of the OFSK CDMA communication system.

Figure 3:
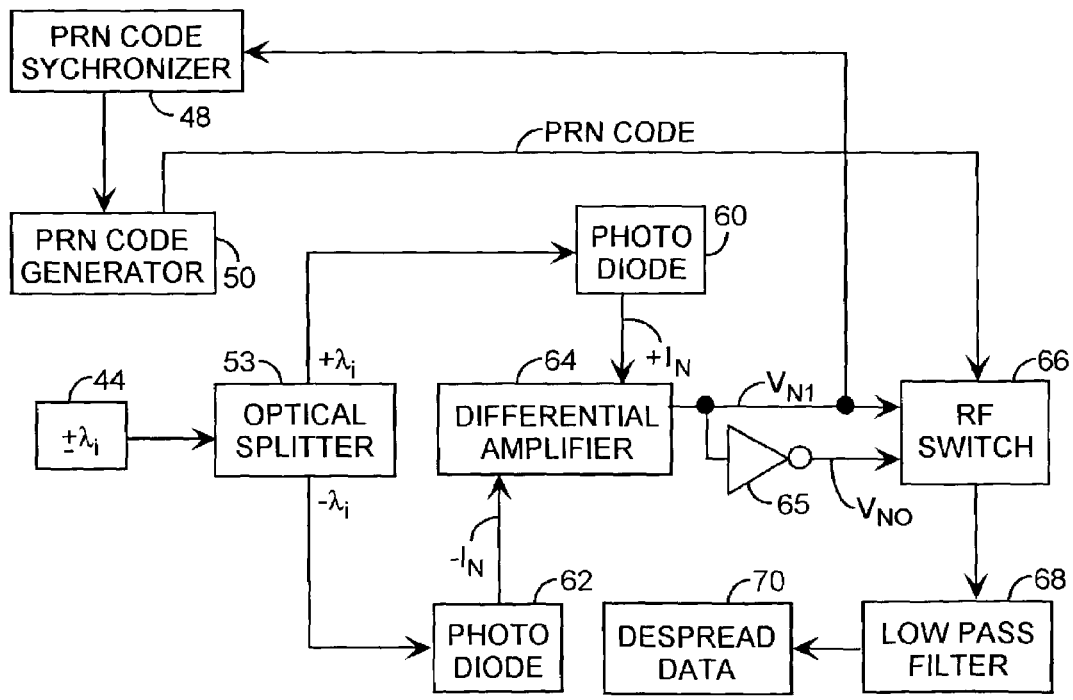
FIG. 3 is a diagram of a $k^{th}$ CDMA receiver.

Referring to all of the Figures, and more particularly to FIG. 3, a representative receiver implementation is shown that can be used for each OFSK CDMA channel. The receiver is immuned to undesired intensity variations produced by signal distortion of the OFSK ±λi wavelength optical signals during transit through optical fibers, optical networks, and splitters of the OFSK CDMA communication system. The receiver may be used to detect any one of the M CDMA channels by despreading the incoming optical signals using a unique preassigned spreading code corresponding to the respective data channel. The despreading of the data 30 by the PRN code 32 is accomplished by first synchronizing code phase of a locally generated code replica of the spreading code with the received code. For code acquisition, a PRN code synchronizer 48 communicates a code phase to a PRN generator 50 for generating the PRN replica code that is synchronized with the chip code modulation of the received OFSK CDMA signal ±λi 44. The received OFSK CDMA ±λi signal 44 is split into the two +λi and −λi wavelengths optical signals using an optical splitter 53. The splitter 53 can use angular dispersion, interference filtering, or other means to spectrally separate the +λi and −λi wavelength signals. The separated +λi and −λi wavelength signals are binary on/off pulsed optical code trains having transitions fluctuating at the code chipping rate.

The separated +λi and −λi wavelength optical pulse code train signals are respectively communicated to photodiodes 60 and 62 for conversion of the channel signal from the optical domain to the electrical domain, for further signal processing. The photodiodes 60 and 62 are optical detectors for detecting respective on/off pulsed optical code trains, for providing respective electrical pulse code trains having $-I_N$ and $+I_N$ current levels. The photodiodes 60 and 62 may be coupled to a transimpedance amplifier that converts photocurrent to a voltage in a hybrid device, not shown, for providing the electrical pulse trains having voltage levels $-V_N$ and $+V_N$. The photodiodes 60 and 62 are photodetectors for detecting the presence and absence of an optical code signal. Hence, the photodiodes 60 and 62 provide opposing on/off electrical pulse code train $+I_N$ or $+V_N$ and $-I_N$ or $-V_N$ signals for encoding one and zero binary values, such that, when the output of the photodiode 60 is high, indicating the presence of the +λi wavelength signals and a binary one data bit, the output of photodiode 62 is low, indicating the absence of the −λi wavelength signal, and when the output of the photodiode 60 is low, indicating the absence of the +λi wavelength signal, and a binary zero data bit, the output of the photodiode 62 is high, indicating the presence of the −λi wavelength signal. Hence, the opposing electrical pulse code trains $+I_N$ or $+V_N$ and $-I_N$ or $-V_N$ are equal but opposite at all times corresponding to on/off separated +λi and −λi wavelength signals received by the photodiodes 60 and 62. The electrical pulse code trains $+I_N$ or $+V_N$ and $-I_N$ or $-V_N$ are communicated to a differential amplifier 64 for combining the opposing electrical pulse code trains $+I_N$ or $+V_N$ and $-I_N$ or $-V_N$. The differential amplifier 64 provides an $I_{N1}$ code signal, and provides an opposing $I_{NO}$ code signal using an inverter 65. The differential amplifier 64 provides a received signal in the electrical domain. The optical splitter 53, photodiodes 60 and 62, and the differential amplifier 64 effectively form an optical converter for converting the received OFSK CDMA signal ±λi 44 in the optical domain into the received signal in the electrical domain.

The on/off intensity variations of the electrical pulse trains $+I_N$ or $+V_N$ and $-I_N$ or $-V_N$ of one and zero binary values into the differential amplifier 64 result in positive or negative binary values that correspond to a non-return-to-zero encoded bipolar PRN code modulating transmitted data. The differential amplifier 64 constructs the bipolar values of the PRN code that modulates data while subtracting off intensity variations due to undesired CDMA signals of intensity variations for the +λi and −λi wavelengths into a sequence of bipolar voltage variations. The integration of these subtractions average to zero over time due to the random nature of the spreading codes. The received signal output of the differential amplifier 64 is split into a positive path and negative path. The negative path is used for inverting the received signal output of the amplifier 64 using the inverter 65 that may be, for example, a unity-gain inverting amplifier. The inverter 65 is connected to one input of the RF switch 66. The output of the amplifier is directly connected to the RF switch 66. The output of the differential amplifier 64 can be used to provide code synchronization by feeding the $I_{N1}$ output of the differential amplifier 64 to the PRN code synchronizer 48 providing conventional autocorrelation and code phase determination for synchronizing the PRN replica code with the modulating received PRN code of the OFSK CDMA signal ±λi 44.

The synchronized replica PRN code from the PRN code generator 50 controls the RF switch 66 for coherent demodulation of the OFSK CDMA signal ±λi 44 that has been separated and converted into the $I_{N1}$ and $I_{NO}$ signals. The coherent demodulation performed by the RF switch 66 is a multiplication of the bipolar sequence of data and modulating code values with the local replica PRN code from the PRN generator 50. The RF switch 68 functions to pass the $V_{NO}$ and $V_{N1}$ signals as controlled by the PRN code. The RF switch 66 is functionally equivalent to a one bit multiplier where the PRN code is NRZ formatted and the NRZ formatted PRN code and received signal for the differential amplifier 64 are multiplied providing an output switch signal that can then be integrated into the despread data signal 70. The output signal of the RF switch 66 is a data stream with the modulating PRN code removed. The data stream is passed through a low-pass filter 68 that functions to integrate the results of the equivalent multiplication, thereby despreading the data from the code as a despreading process, that is equivalent to the correlation of a received spectrum spread signal, for providing the despread data signal 70. The inverter 65, the RF switch 66, and the low pass filter 68 form a despreader for despreading the received signal from the differential amplifier 64 into a despread data signal 70 for detecting the communicated data. The low pass filter 68 functions as an integrator. Alternatively, the output of RF switch 66 may be digitized and integrated with a digital integrate and dump circuit that replaces the low pass filter 68. Conventional signal processing such as code acquisition, timing recovery, and data detection can then be used for data detection as in conventional RF spread-spectrum communications systems. Acquisition and timing recovery operation conventionally occur in the PRN code synchronizer 48.

As may now be apparent, OFSK CDMA signaling can now be applied to optical fiber networks. The transmitter and receiver employ two-wavelength optical CDMA signaling well suited for digitally reconfigurable spreading codes. The invention provides spectral reuse in exiting dense optical CDMA systems that is compatible with existing WDM networks that is spectrally efficient while providing the capability for secure transmissions. The system uses binary frequency shift keying multiplexed optical channels to enable asynchronous user access through CDMA, with increased capacity through fiber optic links. The increased capacity is achieved using a bipolar optical CDMA signaling for providing digital flexibility and code channelization within each frequency shift keyed network for application to all-optical ultra-wide-bandwidth local area networks and expansion of fiber optics system throughput, and also improves crosstalk immunity performance. As such, the system is an extension of dense WDM systems, whereby additional channels multiplexed in CDMA are provided through the encoding of each wavelength pair with bipolar direct-sequence spreading sequences to provide an orthogonal channelization of each WDM channel. This CDMA multiplexing increases the capacity of the WDM system and providing greater immunity to co-channel interference between adjacent WDM wavelength bands while providing a secure means to transport multiple user data across a wide bandwidth network and while maintaining the flexibility to reassign secure spreading sequences to different user channels. Those skilled in the art can make enhancements, improvements, and modifications to the invention, and these enhancements, improvements, and modifications may nonetheless fall within the spirit and scope of the following claims.

What is claimed is:

1. A system for transmitting and receiving a communicated signal having first and second wavelengths that are optical wavelengths for frequency shift keying the communicated signal having spectrum spread data spread by a spreading code for spectrum spreading and modulating data into optically modulated data of the communicated signal that is frequency shift keyed in the optical domain for use with optical code division multiple access signaling, the system comprising, a transmitter code generator for generating the spreading code for directly modulating data into modulated data that is direct sequence spectrum spread modulated data, a transmitter optical generator for generating the first and second wavelengths, the transmitter optical generator comprising a first optical generator for generating the first wavelength and a second optical generator for generating the second wavelength, a transmitter modulator for converting the modulated data into the optically modulated data of the communicated signal communicated by the first and second wavelengths for encoding the modulated data into the optically modulated data having first and second wavelength frequency shift keyed fluctuations in the optical domain, the transmitter modulator comprising a first optical modulator for binary encoding the first wavelength, and comprises a second optical modulator for binary encoding the second wavelength, and comprises an optical coupler for combining the first and second wavelengths from the first and second optical modulators into the optically modulated data of the communicated signal, an optical path for communicating the communicated signal from the transmitter modulator, a code generator for generating a replica code of the spreading code, the replica code being generated in the electrical domain and coherently synchronized to the first and second wavelength frequency shift keyed fluctuations, a photooptical converter for receiving the communicated signal through the optical path and for converting the communicated signal into a received signal in the electrical domain, the photooptical converter converting the first and second wavelengths of the communicated signal by frequency into the received signal, and despreading means for spectrum despreading the received signal into a despread signal in the electrical domain for detecting the data.

2. The system of claim 1 wherein,
the spreading code is a pseudorandom noise spreading code,
the communicated signal is an optical frequency shift keyed code division multiple access communicated signal, and
the first and second wavelengths are orthogonal optical wavelengths.

3. The system of claim 1 wherein the photooptical converter comprises,
an optical splitter for separating communicated signal into a first optical signal of the first wavelength and a second optical signal of the second wavelength,
a first photodiode for converting the first optical signal into a first electrical signal,
a second photodiode for converting the second optical signal into a second electrical signal, and
a differential amplifier for combining the first and second electrical signals into the received signal.

4. The system of claim 1 wherein the received signal is a voltage signal, the photooptical converter comprises,
an optical splitter for separating communicated signal into a first optical signal of the first wavelength and a second optical signal of the second wavelength,
a first photodiode for converting the first optical signal into a first current signal,
a second photodiode for converting the second optical signal into a second current signal, and
a differential amplifier for converting the first and second current signals into the received signal.

5. The receiver system of claim 1 wherein despreader comprises,
an electrical splitting means for splitting the received signal into a first output signal and a second output signal, the first and second output signals are opposing output signals,
an RF switch being controlled by the replica code for passing the first and second output signals into a switched signal, the switch signal being the first output signal during a binary one value of the replica code and being the second output signal during a binary zero value of the replica code, and
a means for integrating the switched signal into the despread signal.

6. The system of claim 1 wherein despreader comprises,
an electrical splitting means for splitting the received signal into a first output signal and a second output signal, the first and second output signals are opposing electrical signals,
an RF switch being controlled by the replica code for passing the first and second output signals into a switched signal, the switch signal being the first output signal during a binary one value of the replica code and being the second output signal during a binary zero value of the replica code, and
a low pass filter for integrating the switched signal into the despread signal.

7. The system of claim 1 wherein the photooptical converter comprises:
an optical splitter for separating communicated signal into a first optical signal of the first wavelength and a second optical signal of the second wavelength;
a first photodetector for converting the first optical signal into a first electrical signal;
a second photodetector for converting the second optical signal into a second electrical signal, and
a differential amplifier for combining the first and second electrical signals into the received signal, and
wherein the despreader comprises:
an electrical splitting means for splitting the received signal into a first output signal and a second output signal, the first and second output signals are opposing electrical signals; and
an RF switch being controlled by the replica code for passing the first and second output signals into a switched signal, the switch signal being the first output signal during a binary one value of the replica code and being the second output signal during a binary zero value of the replica code, and
a low pass filter for integrating the switched signal into the despread signal.

8. The system of claim 1 wherein the photooptical converter comprises:
an optical splitter for separating a communicated signal into a first optical signal of the first wavelength and a second optical signal of the second wavelength;
a first photodetector for converting the first optical signal into a first electrical signal;
a second photodetector for converting the second optical signal into a second electrical signal, and
a differential amplifier for subtracting the first and second electrical signals into the received signal, and
wherein the received signal is a first output signal, and the despreader comprises:
an inverter for generating a second output signal from the first output signal, the first and second output signals are opposing electrical signals;
an RF switch being controlled by the replica code for passing the first and second output signals into a switched signal, the switch signal being the first output signal during a binary one value of the replica code and being the second output signal during a binary zero value of the replica code, the RF switch functioning as a digital demultiplexer, and
a means for integrating the switched signal into the despread signal.

9. The system of claim 1 wherein the photooptical converter comprises:
an optical splitter for separating communicated signal into a first optical signal of the first wavelength and a second optical signal of the second wavelength;
a first photodetector for converting the first optical signal into a first electrical signal;
a second photodetector for converting the second optical signal into a second electrical signal, and
a differential amplifier for subtracting the first and second electrical signals into the received signal, and
a means for NRZ formatting the replica code into a formatted replica code and for multiplying the formatted replica code into a multiplied signal, and
a means for integrating the multiplied signal into the despread signal.

10. The system of claim 1 wherein, the photooptical converter comprises,
an optical splitter for separating the communicated signal into a first optical signal of the first wavelength and a second optical signal of the second wavelength,
a first photodetector for converting the first optical signal into a first electrical signal,
a second photodetector for converting the second optical signal into a second electrical signal, and
combining means for combining the first and second electrical signals into the received signal.

11. The system of claim 1 wherein photooptical converter comprises:
an optical splitter for separating a communicated signal into a first optical signal of the first wavelength and a second optical signal of the second wavelength;
a first photodetector for converting the first optical signal into a first electrical signal;
a second photodetector for converting the second optical signal into a second electrical signal, and
a differential amplifier for combining the first and second electrical signals into the received signal, and
wherein the received signal is a first output signal, the the despreader comprising:
an inverter for generating a second output signal from the first output signal, the first and second output signals are opposing electrical signals;
an RF switch being controlled by the replica code for passing the first and second output signals into a switched signal, the switch signal being the first output signal during a binary one value of the replica code and being the second output signal during a binary zero value of the replica code, and
a low pass filter for integrating the switched signal into the despread signal.

12. The system of claim 1 wherein the optical path comprises an optical fiber.

13. The system of claim 1 wherein the optical path comprises an optical network of optical transmitters and receivers.

* * * * *